(12) United States Patent
Rose

(10) Patent No.: US 7,963,755 B1
(45) Date of Patent: Jun. 21, 2011

(54) POST CURE ROTATIONAL STATIONS

(75) Inventor: Billy Lewis Rose, Barberton, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 49 days.

(21) Appl. No.: 12/629,428

(22) Filed: Dec. 2, 2009

(51) Int. Cl.
   *B29C 35/16* (2006.01)
(52) U.S. Cl. .................... 425/28.1; 425/58.1
(58) Field of Classification Search ............ 425/28.1, 425/58.1, 445
   See application file for complete search history.

(56) References Cited

U.S. PATENT DOCUMENTS

| | | | |
|---|---|---|---|
| 3,645,660 A | 2/1972 | Hugger et al. | 425/445 |
| 3,692,444 A | 9/1972 | Hugger et al. | 425/28 |
| 3,852,008 A | 12/1974 | Shichman | 425/28 P |
| 5,198,234 A * | 3/1993 | Siegenthaler | 425/58.1 |
| 5,853,648 A | 12/1998 | Cleveland | 264/348 |
| 6,660,212 B1 | 12/2003 | Balter et al. | 264/501 |
| 2006/0099285 A1 | 5/2006 | Mitamura et al. | 425/58.1 |

* cited by examiner

*Primary Examiner* — James Mackey
(74) *Attorney, Agent, or Firm* — June E. Rickey

(57) ABSTRACT

An apparatus for cooling a cured tire comprising:
  A retractable support member having a distal end connected to a support plate;
  the support plate having an inflatable bladder mounted about its circumferential edge; and wherein the retractable support member is rotatable about its axis.

5 Claims, 5 Drawing Sheets

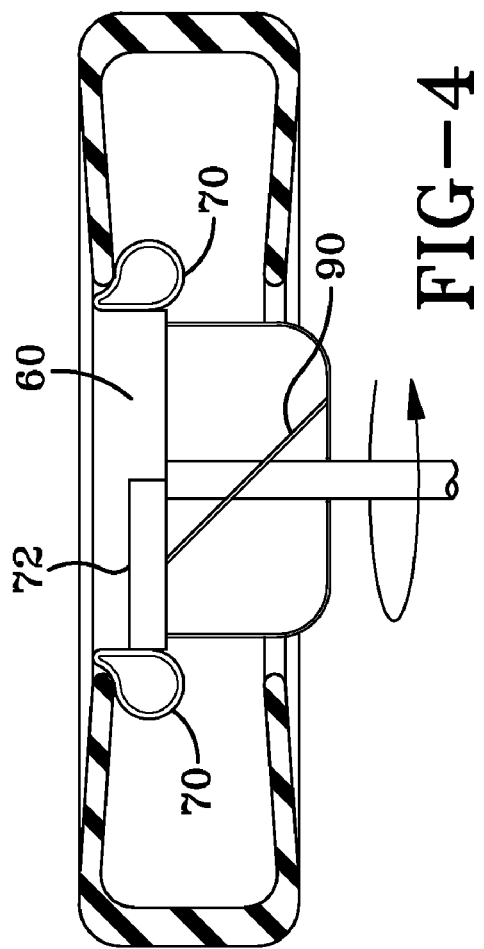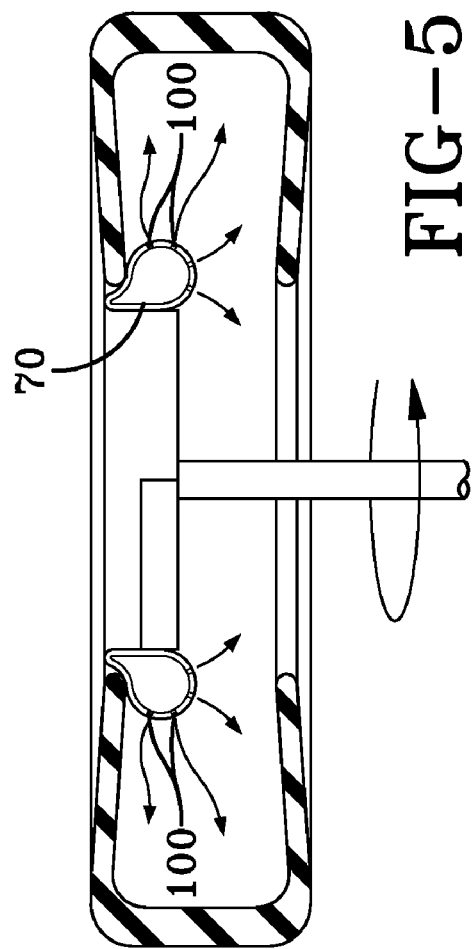

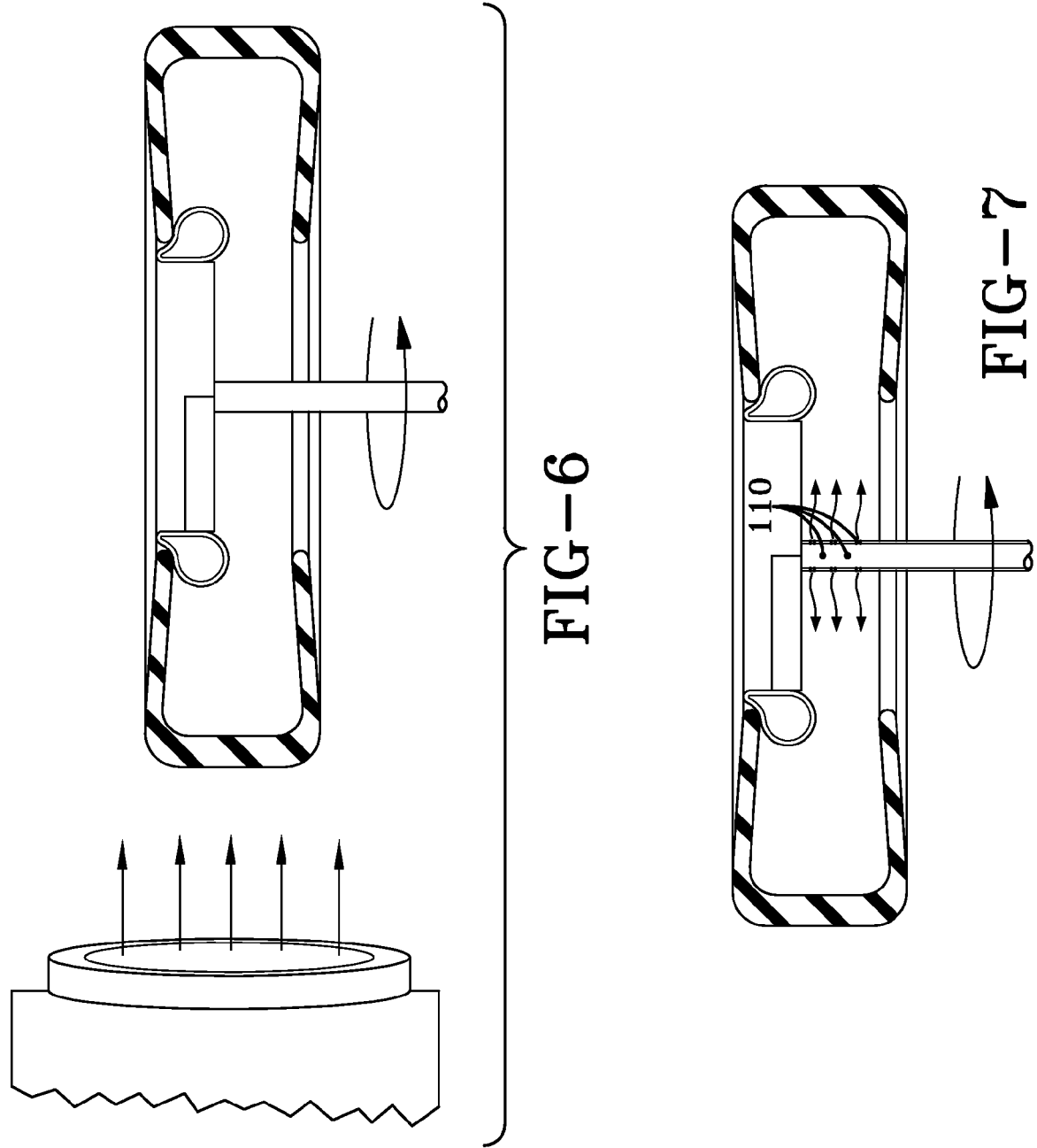

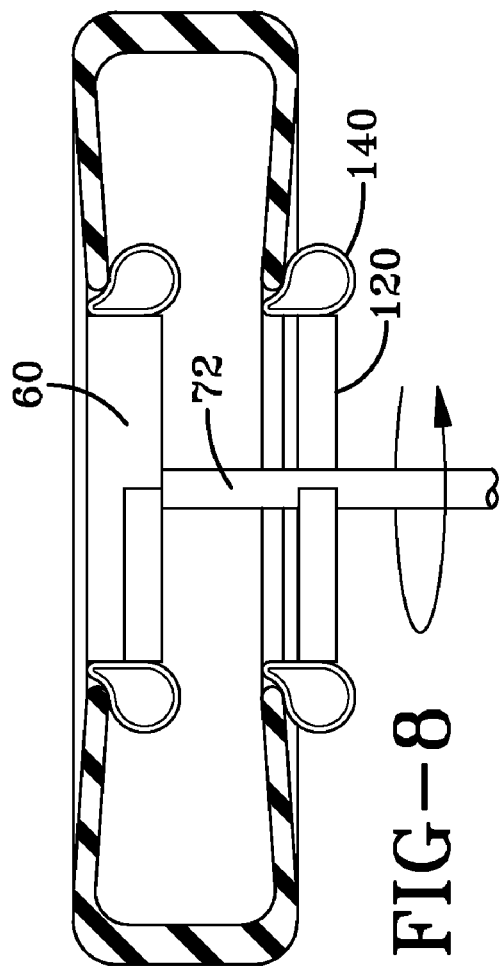
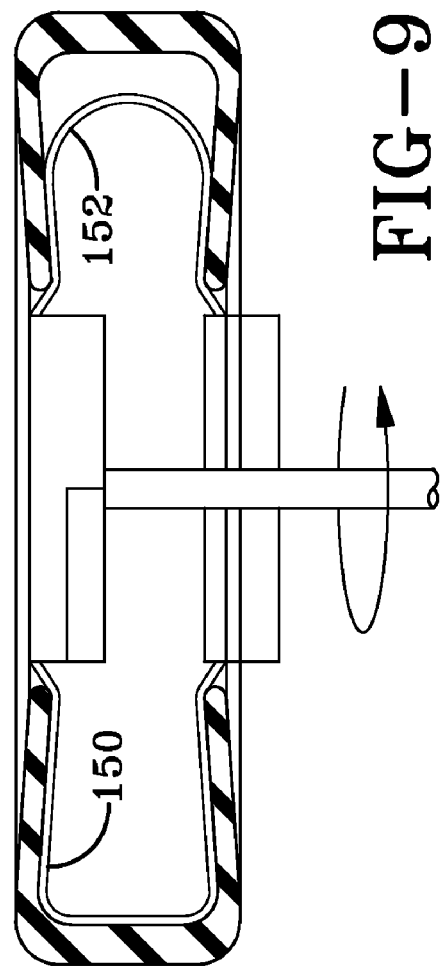

POST CURE ROTATIONAL STATIONS

FIELD OF THE INVENTION

The invention relates to an apparatus and a method for post mold cycle cooling of a pneumatic tire after removal of the tire from the mold.

BACKGROUND OF THE INVENTION

A tire is typically removed from a tire curing mold while it is still hot. The tire typically continues to cure as it cools down outside of the mold. While cooling, the reinforcement fibers of the carcass and belts are contracted. However, the degree of contraction may not be uniform, contributing to tire nonuniformity. Further, conveyors are often utilized to transport the tire hot off the press, typically in a horizontal fashion. This type of handling may contribute to mechanical stress on the tire and hence, tire nonuniformity.

Various methods have been proposed in the art to cool the tire. These methods are often referred to as post cure inflation, where upon removing the tire from the curing mold, the tire is placed upon a stand which allows the tire to be inflated and then held at a pressure as the cooling continues. The post cure inflation type devices of the prior art often involve complex mechanical devices.

SUMMARY OF THE INVENTION

A first aspect of an invention includes an apparatus for cooling a cured tire which includes a retractable support member having a distal end connected to a support plate. The support plate has an inflatable bladder mounted about its circumferential edge; and the retractable support member is rotatable about its axis. The inflatable bladder may optionally include a plurality of holes. The retractable support member may be retracted through a conveyor belt. The apparatus may further include a fan blade rotatable about the retractable support member. The retractable support member may further include one or more nozzles for directing a stream of cooling fluid towards the cured tire.

DEFINITIONS

"Aspect Ratio" means the ratio of a tire's section height to its section width.

"Axial" and "axially" means the lines or directions that are parallel to the axis of rotation of the tire.

'Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Bias Ply Tire" means that the reinforcing cords in the carcass ply extend diagonally across the tire from bead-to-bead at about 25-65° angle with respect to the equatorial plane of the tire, the ply cords running at opposite angles in alternate layers "Breakers" or "Tire Breakers" means the same as belt or belt structure or reinforcement belts.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions extending along the perimeter of the surface of the annular tread perpendicular to the axial direction; it can also refer to the direction of the sets of adjacent circular curves whose radii define the axial curvature of the tread as viewed in cross section.

"Cord" means one of the reinforcement strands, including fibers, which are used to reinforce the plies.

"Inner Liner" means the layer or layers of elastomer or other material that form the inside surface of a tubeless tire and that contain the inflating fluid within the tire.

"Inserts" means the reinforcement typically used to reinforce the sidewalls of runflat-type tires; it also refers to the elastomeric insert that underlies the tread.

"Ply" means a cord-reinforced layer of elastomer-coated, radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which the ply cords which extend from bead to bead are laid at cord angles between 65° and 90° with respect to the equatorial plane of the tire.

"Sidewall" means a portion of a tire between the tread and the bead.

"Laminate structure" means an unvulcanized structure made of one or more layers of tire or elastomer components such as the innerliner, sidewalls, and optional ply layer.

BRIEF DESCRIPTION OF THE DRAWINGS

The invention will be described by way of example and with reference to the accompanying drawings in which:

FIG. 4 is a second embodiment of a tire cooling mechanism;

FIG. 5 is a third embodiment of a tire cooling mechanism;

FIG. 6 is a fourth embodiment of a tire cooling mechanism;

FIG. 7 is a fifth embodiment of a tire cooling mechanism;

FIG. 8 is a sixth embodiment of a tire cooling mechanism; and

FIG. 9 is a seventh embodiment of a tire cooling mechanism.

DETAILED DESCRIPTION OF THE INVENTION

Figure 1:
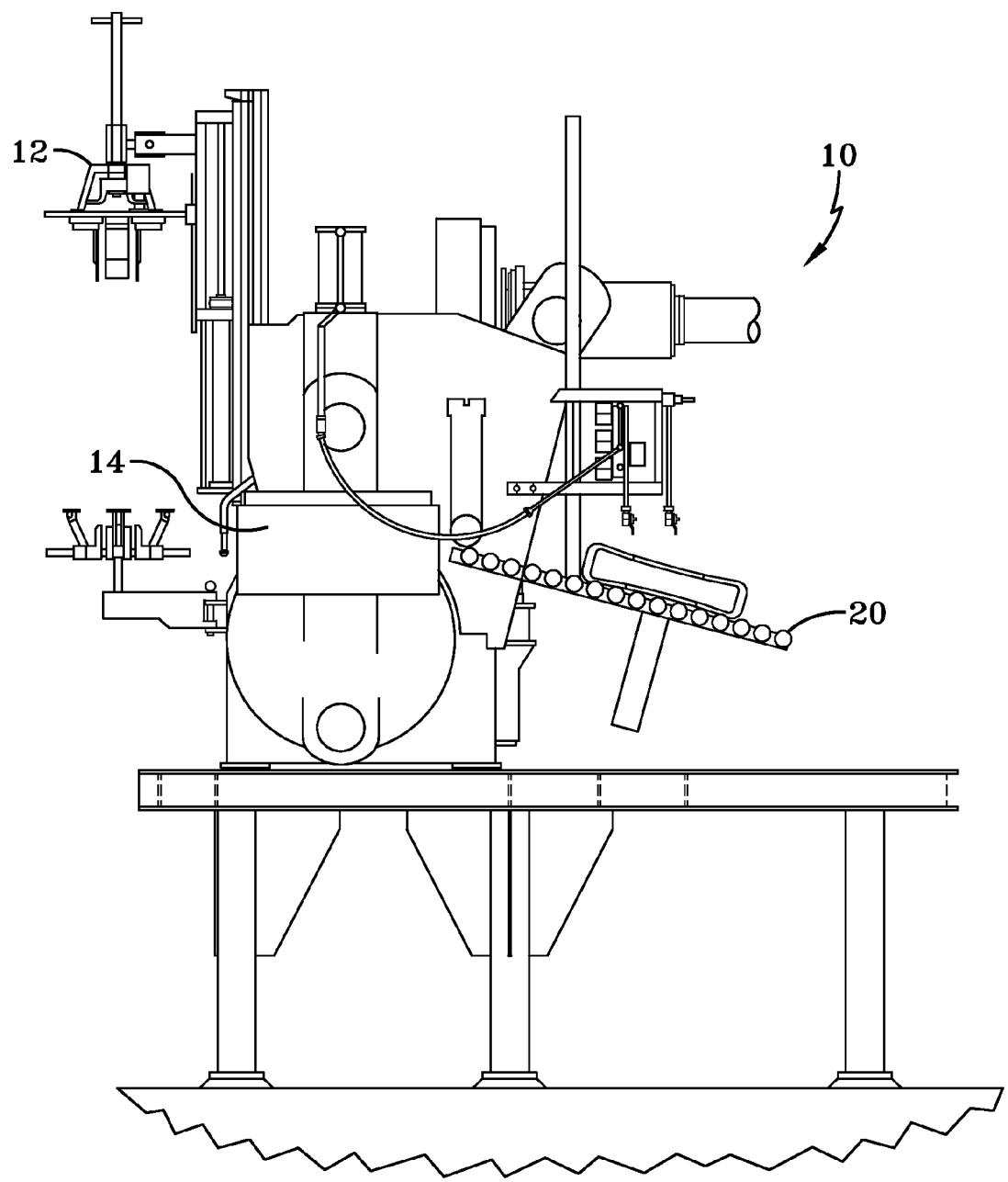
FIG. 1 is a side view of a tire press assembly and conveyor belt.
Figure 3:
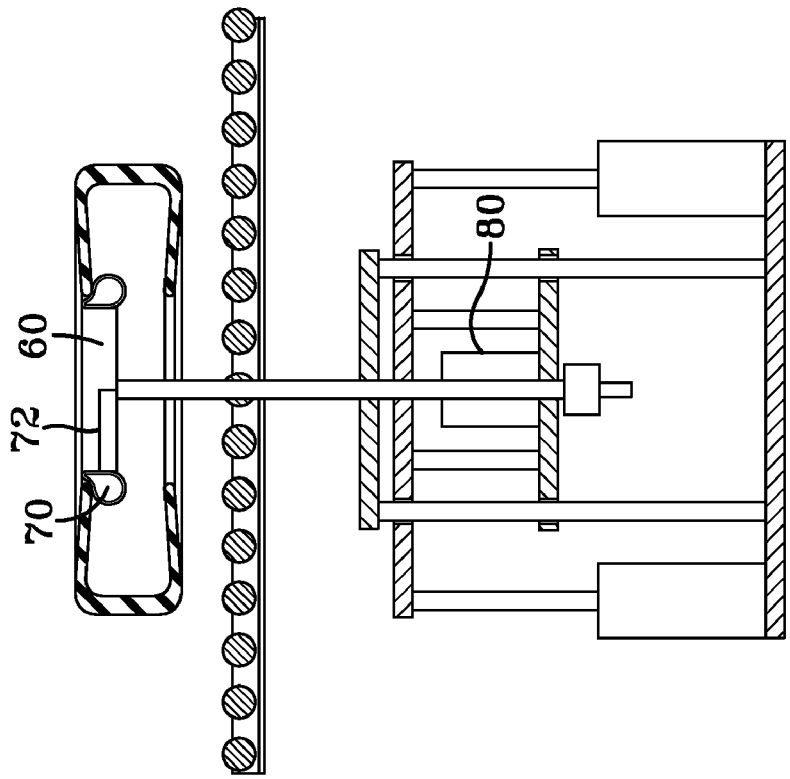
FIG. 3 is the tire cooling station of FIG. 2 shown in the actuated condition.
Figure 2:
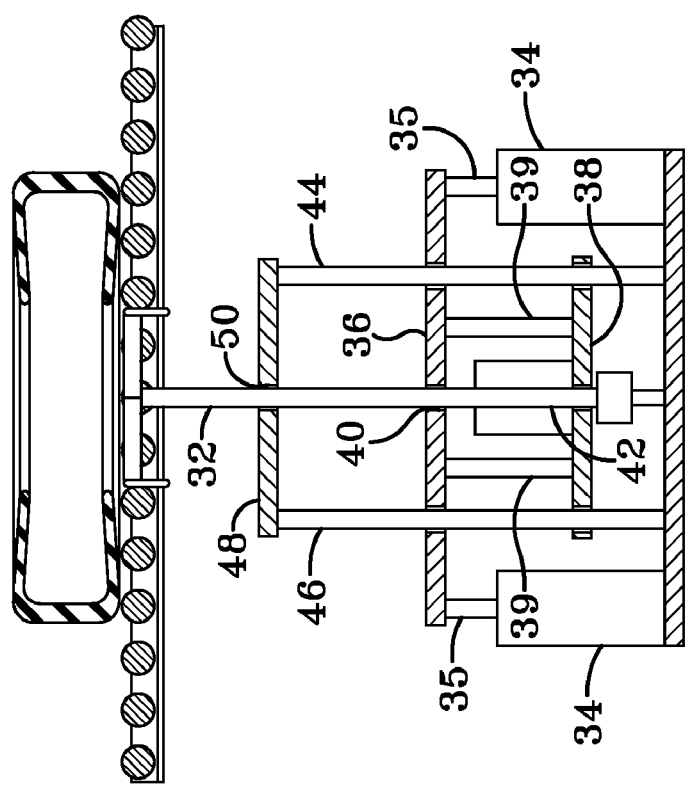
FIG. 2 is a cross-sectional view of a tire cooling station of the present invention shown in the unactuated condition.

FIG. 1 illustrates a prior art tire building press 10 having a tire loader 12 for loading a green tire carcass into a mold 14. After the green tire carcass is cured in the tire mold, the hot cured tire carcass is typically removed from the tire mold and placed onto a conveyor belt 20. Located on the conveyor belt 20 is a tire cooling mechanism of the present invention as shown in FIGS. 2-9. The tire cooling mechanism 30 includes a tire lift mechanism which includes a translating vertical support bar 32 which is retractable from a first position to a second position. The vertical support bar 32 is actuated by one or more pneumatic cylinders 34. Preferably two pneumatic cylinders 34 are used. A piston 35 of pneumatic cylinder 34 is connected to cross member 36. Actuation of piston 35 raises and lowers cross member 36 and support frame members 38, 39. The vertical support member 32 is connected to the support frame members 38, 39 at junctions 40, 42. Actuation of pistons 35 raises and lowers vertical support bar 32. The tire lift mechanism further includes an outer support frame comprised of one or more vertical supports 44, 46 joined to a horizontal member 48. The horizontal member 48 has a guide bushing 50 which surrounds the vertical support member 32 and provides lateral support. Located on the distal end of the vertical support member is a tire support plate 60. The tire support plate 60 is circular in shape oriented in a horizontal plane and sized to support the tire bead area. The tire support plate 60 is actuated by pistons 35 through a hole in the conveyor belt. The tire support plate 60 is flush with the conveyor belt in an unactuated position, as shown in FIG. 2. FIG. 3 illustrates the tire support member in the actuated position, and supporting a cured tire. Located on the outer circumferential edge of the support plate 60 is an inflatable bladder 70. Inflation of the bladder secures the tire to the support plate, because the bladder is wedged between the tire bead and the plate. An air supply line 72 provides a source of air/gas to the inflatable bladder. The air supply line 72 may be embedded within the support plate 60 and located within the hollow interior of the vertical support member.

When the tire support mechanism is in the actuated position of FIG. 3, the vertical support member is rotated by motor 80 about 10 to about 15 rpm (revolutions per minute). FIG. 4 illustrates an optional fan blade which is rotatable about the vertical support member 32. Rotation of the fan blades assists in the cooling of the tire.

FIG. 5 illustrates a second embodiment of the invention wherein all of the above features are included unless otherwise indicated. The bladders 70 have a plurality of holes 100 disposed about the outer surface for cooling of the interior of the tire. FIG. 6 illustrates that the tire support mechanism can further include an optional external blower which targets the outer surface of the cured tire while it rotates. FIG. 7 illustrates an additional optional feature wherein one or more nozzles 110 or orifices are mounted about the vertical support member and circulate air within the interior of the cured tire.

FIG. 8 illustrates a third embodiment of the invention wherein there are two support plates 60, 120, one for each bead. The outer surface of each support plate 60, 120 further includes the inflatable bladder 70, 140. Air or other fluid is supplied to the inflatable bladders 70, 140 via supply line 72.

FIG. 9 illustrates a fourth embodiment of the invention. In this embodiment, bladder 70 is replaced with an inflatable bladder 150 which when inflated, conforms as shown to the interior of the tire. The bladder need not fully conform to the internal shape of the tire and may have shape 152. The bladders 150, 152 may optionally include holes for allowing the passage of air/gas out of the bladder and adjacent the tire.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An apparatus for cooling a cured tire comprising:
   A retractable support member having a distal end connected to a support plate;
   Said support plate having an inflatable bladder mounted about its circumferential edge; and wherein said retractable support member is rotatable about its axis.

2. The apparatus of claim 1 wherein the inflatable bladder has a plurality of holes.

3. The apparatus of claim 1 wherein the retractable support member is retracted through a conveyor belt.

4. The apparatus of claim 1 further comprising a fan blade rotatable about the retractable support member.

5. The apparatus of claim 1 wherein the retractable support member has one or more nozzles for directing a stream of gas towards the cured tire.

* * * * *